US012699597B2

(12) United States Patent
Hofer et al.

(10) Patent No.: US 12,699,597 B2
(45) Date of Patent: Aug. 4, 2026

(54) SYSTEMS AND METHODS FOR IMPLEMENTING TRANS-CLOUD APPLICATION TEMPLATES

(71) Applicant: CloudBlue LLC, Irvine, CA (US)

(72) Inventors: Christian Hofer, Seville (ES); Javier Perez-Griffo, Seville (ES); Pablo Banos, Seville (ES); Alberto Del Valle, Seville (ES)

(73) Assignee: CloudBlue LLC, Irvine, CA (US)

( * ) Notice: Subject to any disclaimer, the term of this patent is extended or adjusted under 35 U.S.C. 154(b) by 0 days.

(21) Appl. No.: 17/477,354

(22) Filed: Sep. 16, 2021

(65) Prior Publication Data

US 2022/0083392 A1     Mar. 17, 2022

Related U.S. Application Data

(60) Provisional application No. 63/079,413, filed on Sep. 16, 2020.

(51) Int. Cl.
    *G06F 9/54*        (2006.01)
    *G06F 9/50*        (2006.01)
    *G06N 7/01*        (2023.01)
(52) U.S. Cl.
    CPC .......... *G06F 9/5072* (2013.01); *G06F 9/5055* (2013.01); *G06F 9/547* (2013.01); *G06N 7/01* (2023.01)
(58) Field of Classification Search
    CPC ..... H04L 41/22; H04L 41/40; H04L 41/5054; H04L 41/0893; H04L 41/0843;

(Continued)

(56) References Cited

U.S. PATENT DOCUMENTS

| | | | | |
|---|---|---|---|---|
| 9,621,428 | B1 * | 4/2017 | Lev ......................... | H04L 41/12 |
| 2013/0246625 | A1 * | 9/2013 | Vendrow ............. | H04L 41/5041 |
| | | | | 709/226 |

(Continued)

FOREIGN PATENT DOCUMENTS

GB        2522031 A   *   7/2015       ........... G06F 9/5061

OTHER PUBLICATIONS

B. Satzger, W. Hummer, C. Inzinger, P. Leitner and S. Dustdar, "Winds of Change: From Vendor Lock-In to the Meta Cloud," in IEEE Internet Computing, vol. 17, No. 1, pp. 69-73, Jan.-Feb. 2013, doi: 10.1109/MIC.2013.19. (Year: 2013).*

(Continued)

*Primary Examiner* — Tom Y Chang
(74) *Attorney, Agent, or Firm* — Ice Miller LLP

(57) ABSTRACT

Systems and methods for implementing Trans-Cloud infrastructure deployment include receiving an input from a user, the input comprising a Topology and Orchestration Specification for Cloud Applications (TOSCA) template and input parameters for instantiation via a graphical user interface (GUI), applying the input parameters to the TOSCA template, creating a directed acyclic graph of the TOSCA template based on defined relationships; and executing the instantiated model through API calls to orchestration engine based on the order defined in the acyclic graph. The TOSCA template and input parameters can specify a region for deployment and/or server plan.

18 Claims, 5 Drawing Sheets

(58) Field of Classification Search

CPC . H04L 41/0806; H04L 41/122; H04L 47/829; H04L 67/10

See application file for complete search history.

(56) References Cited

U.S. PATENT DOCUMENTS

| | | | | |
|---|---|---|---|---|
| 2016/0156664 | A1* | 6/2016 | Nagaratnam | H04L 63/20 726/1 |
| 2017/0289060 | A1* | 10/2017 | Aftab | H04L 41/5054 |
| 2017/0302537 | A1* | 10/2017 | Maes | H04L 41/145 |
| 2018/0060106 | A1* | 3/2018 | Madtha | G06F 16/951 |
| 2018/0081990 | A1* | 3/2018 | Johnson | G06F 16/9024 |
| 2018/0131565 | A1 | 5/2018 | Williams | |
| 2018/0270120 | A1* | 9/2018 | Tung | H04L 67/34 |
| 2019/0199597 | A1* | 6/2019 | Valisammagari | H04L 41/5045 |
| 2019/0386886 | A1* | 12/2019 | Saxena | H04L 12/4641 |
| 2020/0264858 | A1* | 8/2020 | Li | G06F 8/60 |

OTHER PUBLICATIONS

Challita, Stéphanie, et al. "Model-Based Cloud Resource Provisioning with TOSCA and OCCI." CoRR (2020).

Katsaros, Gregory, et al. "Cloud application portability with tosca, chef and openstack." 2014 IEEE international conference on cloud engineering. IEEE, 2014.

Dash, Anshuman. Dynamic cloud provisioning based on TOSCA. MS thesis. 2017.

Rinaldi, Luca, Antonio Brogi, and Jacopo Soldani. "Orchestrating applications with TOSCA and Docker." (2017).

Dang, Phi. Live-modeling: enabling deployments at modeling time in OpenTOSCA. MS thesis. 2020.

International Search Report and Written Opinion issued in PCT/US2021/050726, mailed on Dec. 17, 2021.

Takayuki Kuroda, Proposal of a template-based provisioning method that allows recombination of deployment agents, Institute of Electronics, Information and Communication Engineers technical research report, vol. 115 No. 482 IEICE Technical Report, Japan, Institute of Electronics, Information and Communication Engineers (IEICE), Apr. 12, 2016, vol. 115, p. 151-158.

Office Action issued in Japanese Patent Application No. 2023-516143, mailed Apr. 17, 2024, 9 pgs.

Binz T., et al., "TOSCA: Portable Automated Deployment and Management of Cloud Applications," Advanced Web Services, New York, NY, Springer New York, Aug. 6, 2013, pp. 527-549, DOI: 10.1007/978-1-4614-7535-4_22, ISBN 978-1-4614-7535-4, XP055467190.

Extended European Search Report for European Application No. 21870238.9, dated Sep. 30, 2024, 12 Pages.

International Preliminary Report on Patentability for International Application No. PCT/US2021/050726, dated Mar. 30, 2023, 13 Pages.

Wettinger J., "Concepts for Integrating DevOps Methodologies With Model-Driven Cloud Management Based on TOSCA," Diplomarbeit Nr 3322,, Jan. 16, 2014, pp. 1-84, XP055218943, [Retrieved on Oct. 7, 2015] Retrieved from URL: http://elib.uni-stuttgart.de/opus/volltexte/2014/8911/pdf/DIP_3322.pdf.

* cited by examiner

300

500

SYSTEMS AND METHODS FOR IMPLEMENTING TRANS-CLOUD APPLICATION TEMPLATES

CROSS-REFERENCE TO RELATED APPLICATION

The present application claims priority to U.S. Provisional Patent Application Ser. No. 63/076,994, filed on Sep. 20, 2020, which is incorporated in its entirety herein.

TECHNICAL FIELD OF THE DISCLOSED EMBODIMENTS

The present disclosure relates to cloud computing infrastructure configuration and deployment.

BACKGROUND OF THE DISCLOSED EMBODIMENTS

Systems for deploying infrastructure in a cloud computing environment are focused on the automated deployment of infrastructure to a specific cloud vendor. Such systems allow cloud infrastructure configuration and deployment, such as RightScale Cloud Application Templates, Cloudify, and Hashicorp Terraform. However, known solutions are challenging and inefficient, as they require the configuration to be bound to a specific cloud vendor. These solutions are "multi-cloud" in the sense that they allow describing the infrastructure on various cloud vendors, but they require a specific description for each cloud vendor. However, such solutions do not generally permit configuring infrastructure across multiple cloud vendors at once.

SUMMARY OF THE DISCLOSED EMBODIMENTS

The presently disclosed embodiments allow describing the infrastructure independently of the cloud vendor, making the choice of cloud vendor a mere parameter during automated deployment of the infrastructure, and allow automated deployment of complete infrastructures in the cloud of any cloud vendor. This trans-cloud approach allows for configuring infrastructure across multiple cloud vendors at once.

The presently disclosed embodiments allow a user to automatically deploy infrastructure within multiple cloud vendors based on an infrastructure description (service template). The presently disclosed embodiments provide abstractions over the specific cloud vendor infrastructure. The presently disclosed embodiments use the Topology and Orchestration Specification for Cloud Applications (TOSCA) standard for describing infrastructure independently from the implementation, as well as a new component—a TOSCA interpreter that extends previously known orchestration engines (e.g., Ingram Micro Cloud Orchestrator) to allow workflow automation. This improvement allows the user to select cloud vendors, regions, server plans, etc. dynamically during cloud application template deployment.

Systems and methods provided permit automated Trans-Cloud deployment of cloud infrastructures.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
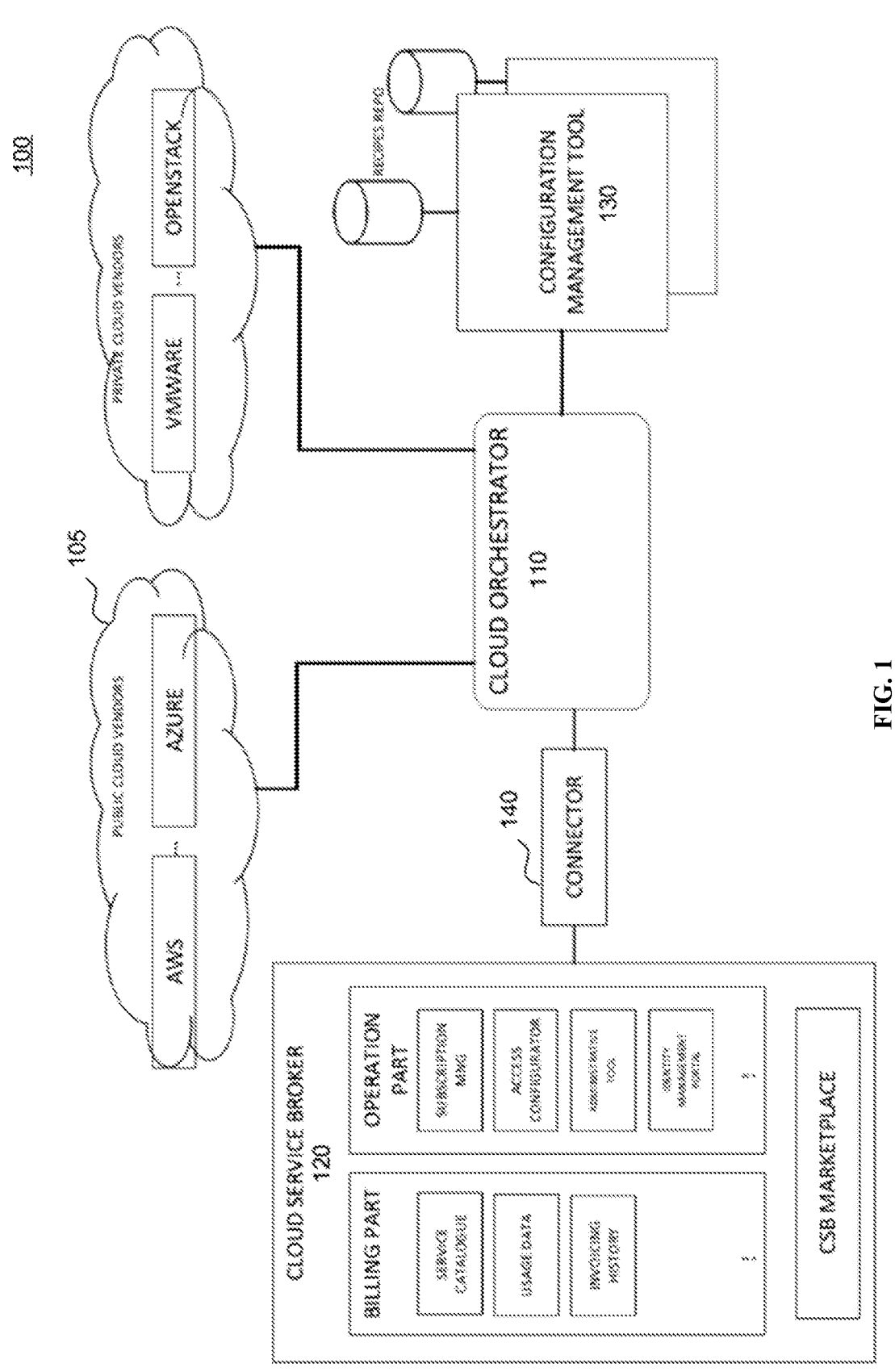
FIG. 1 schematically illustrates an embodiment of a system for automating deployment of cloud infrastructures, according to an example embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In one embodiment, the solution can be implemented using a Cloud Orchestrator, such as Ingram Micro Cloud Orchestrator (provided from Ingram Micro Inc., Irvine, CA). In some embodiments, the Cloud Orchestrator permits a user to create and deploy infrastructures completely, step by step (i.e.: blueprint by blueprint, network by network, firewall profile by firewall profile, server by server). The Cloud Orchestrator does not allow deploying complete infrastructures automatically.

FIG. 1 illustrates a cloud infrastructure deployment system that permits automated deployment of complete infrastructures in the cloud of any cloud vendor. According to some embodiments, trans-cloud application templates provide trans-cloud abstractions that can created and processed for deploying infrastructures. As schematically illustrated in FIG. 1, a Cloud Orchestrator 110 is integrated with a cloud services brokerage (CSB) platform 120 (for example, the "Ingram Micro Cloud Blue Platform," or other CSB platform) via a connector 140.

In some embodiments, cloud orchestrator 110 can include one or more system(s) for managing cloud infrastructures of different cloud vendors 105. Cloud vendors 105 can include, for example, public cloud vendors (e.g., Amazon Web Services (AWS), Azure, Google cloud platform, IBM Bluemix, etc.) and private cloud vendors (e.g., VMware, OpenStack, etc.).

In some embodiments, connector 140 can be implemented using an administrative application programming interface (API). Connector 140 can provision customers, users and cloud credentials on CSB platform 120. In some embodiments, connector also initiates a single sign on (SSO) workflow that allows users to log in to the CSB platform 120.

In some non-limiting examples, a user (e.g., a customer, developer, administrator, etc.) logs in to CSB platform 120 and creates a subscription to public cloud services (e.g., Azure services, or the like). The user then configures and deploys infrastructure through the cloud orchestrator portal, for example configuration management tool 130. The CSB platform handles the business logic, like collecting usage data, storing a service catalog with prices, invoicing customers, creating/deleting/changing subscriptions, managing access, providing SSO to public cloud vendor portals and cloud orchestrator portal, providing multi-tier and multi-channel management and business intelligence.

Figure 2:
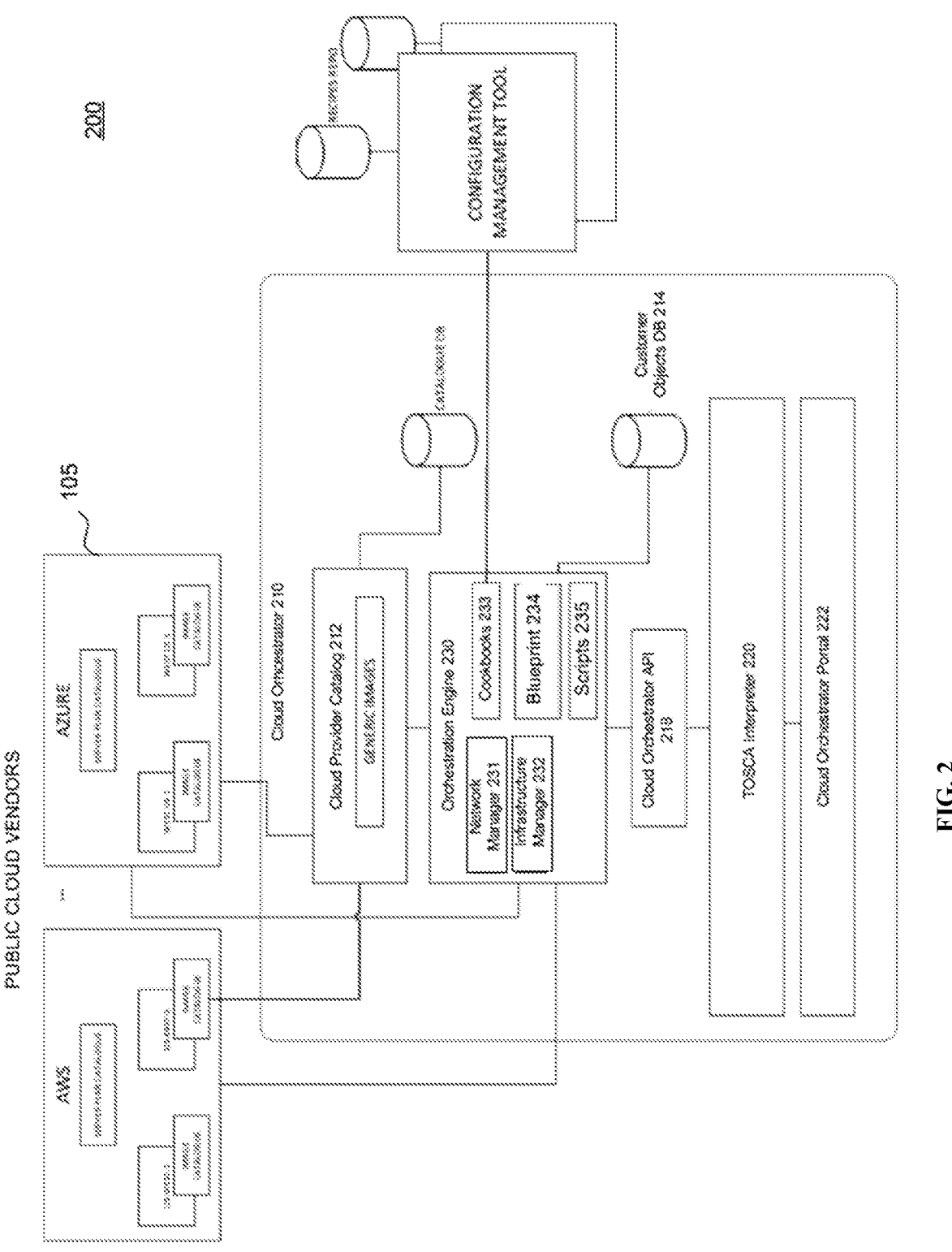
FIG. 2 schematically illustrates a Cloud Orchestrator architecture, according to an example embodiment.

FIG. 2 schematically illustrates cloud orchestrator architecture in the environment of a cloud infrastructure deployment system. Referring to FIG. 2, system 200 for performing Trans-Cloud infrastructure deployment includes cloud orchestrator 210 architecture, public cloud vendors 220, and configuration management tool 240.

Generally, a cloud infrastructure can be manually deployed one-by-one through a web user interface (UI) or through an API. For example, a user could create a virtual network, then create two subnets in it. A user can place a server in each subnet, each with a firewall profile and with a specific blueprint describing the software configuration (including the operating system (OS)). In this blueprint, a user can make one server point to the other server. Conventionally, blueprints and firewall profiles were independent of the cloud vendor. During network (if a server is part of a virtual network) or server creation (if a server is not part of a virtual network), the cloud vendor had to be selected. Previously, the user had to create the networks, the blueprints, the servers, etc. by hand.

According to embodiments described herein, cloud orchestrator 210 permits automation of infrastructure deployment processes, including Trans-Cloud application templates. This is different from conventional systems that only permit automation tediously using an API, for example, requiring scripts to be written ad-hoc to perform a list of API calls. According to some embodiments, system 200 permits frontend server connection to the backend server dynamically. That is, if the IP address of the backend server changes at some point, the frontend server will automatically update the IP address it is pointing to. This aspect is different from conventional systems that do not update the connection.

According to some embodiments, cloud orchestrator 210 can include cloud vendor catalog 212, customer objects database 214, configuration data hub 216, cloud orchestrator API 218, TOSCA interpreter 220, cloud orchestrator portal 222, and orchestration engine 230.

Cloud vendor catalog 212 stores generic images of various OS and various applications. Cloud vendor catalog 212 can store scripts that periodically communicate with cloud vendors' image catalogs and update the cloud vendor catalog of the cloud orchestrator. Customer objects database 214 can store information about customer objects, including information involving one or more to cloud service subscriptions, SSO information, configuration information, and the like. Configuration data hub 216 can store one or more roles to define patterns and processes that exist across nodes in an organization, for example, belonging to a job function.

Compared to conventional systems, embodiments include of system 200 include a Trans-Cloud TOSCA interpreter 220, as shown in FIG. 2. TOSCA interpreter 220 can perform communication with other components and perform automation of deployment of a complete infrastructure.

TOSCA interpreter 220 can be a TOSCA orchestration component that executes service templates by calls to the cloud orchestrator API 218. In some non-limiting examples, TOSCA interpreter 220 receives a TOSCA archive and additional input parameters as input. An input parameter can be anything that is a property of a TOSCA node. For example, the network CIDR (Classless Inter-Domain Routing) of a private network, the number of instances of a server array, etc. In case of the TOSCA interpreter of the presently disclosed embodiments, it can also be the cloud provider and region of a network or server or the server plan of a server. The TOSCA archive contains the service template plus any additional files (Chef cookbooks, scripts, etc.). The service template contains a description of all infrastructure components (networks, servers, firewall profiles, load balancers, etc.), together with the description of the software stack to be executed on the infrastructure. The TOSCA interpreter applies the additional input parameters on the template and instantiates the template by creating all necessary resources through the Orchestration engine.

According to some embodiments, TOSCA interpreter 220 dynamically builds a directed acyclic graph of TOSCA node template instances. For instantiating the TOSCA service template, the TOSCA interpreter 220 uses an abstraction of computing, networking, and software node and relationship types, derived from TOSCA standard types. The TOSCA service template is cloud vendor-agnostic. Cloud vendors may have a special order of instantiating servers and network, sometimes the network should be configured first, sometimes vice-versa. Orchestrator engine 230 defines an order that is compatible with the particular cloud vendor. TOSCA interpreter 220 can modify the order defined in the TOSCA service template to accommodate the Orchestrator engine. For example, TOSCA interpreter 220 has a standard model to bind servers to networks via "ports" (basically working as virtual NICs (virtual network interface controllers)). They are virtual NICs, not real NICs, basically organizing the access of servers to networks. In TOSCA, the relationship between Compute and Network node templates is mediated by a Port node template, that more or less has the same role as the virtual NIC on the cloud vendor side. What the TOSCA interpreter is doing here is—instead of following the dependency order defined in the TOSCA service template: first server, then virtual NIC— to create the NIC and the server in a joint process in order to accommodate to the order required by the Orchestrator engine.

During the process of TOSCA service template instantiation, the TOSCA interpreter 220 uploads the list of cookbooks chosen by the user to the Orchestration engine. The Orchestration engine, in turn, creates roles in the configuration data hub, e.g. Chef.

Then, TOSCA interpreter 220 deploys the infrastructure according to its service template on the cloud vendor premises. During or after server boot (depending on the cloud vendor), the TOSCA interpreter 220 installs a small client program on the server that deploys and manages the software stack by installing a client that connects to the configuration management tool and obtains the correct software configuration. The client program also makes sure that the specified startup scripts are executed Cloud orchestrator API 218 provides an integration layer between TOSCA interpreter 220 and orchestration engine 230. Cloud orchestrator API 218 provides programmatic access to all operations of the orchestrator engine 230 that are offered on the web user interface. This includes the definition of firewall profiles, software blueprints, the upload of Chef cookbooks, the definition of scripts, the creation of networks and servers, etc.

Cloud orchestrator portal 222 provides a UI through which users can interact with and implement the cloud orchestra. Through cloud orchestrator portal 222, users can select subscriptions on one or more public cloud vendors, create a blueprint where the user can select applications to deploy on this infrastructure and how the applications should be deployed (e.g., front-end in AWS server, back-end in Azure). The user can input operating system(s) (OS), Chef cookbooks, and other inputs, including but not limited to scripts to be executed, for example, on server start-up or shutdown, or manually any time the server is running. The user can also pick additional services, including but not limited to firewalls, load balancers, etc.

Orchestration engine 230 generates abstractions necessary to create a cloud infrastructure. It communicates with the configuration management tool, and with the different cloud vendors, in order to facilitate the deployment and operation of networks and servers with different software configurations across different cloud vendors. It defines an order of instantiating servers and network that is compatible with the different cloud vendors. The creation of unified API calls is manual. Cloud orchestrator portal 222 (including orchestrator web UI) and cloud orchestrator API 218 can be used to control orchestration engine 230. The core of this instantiation is the creation of firewall profiles, networks, and servers in the correct order. And part of the creation of a server is to define its blueprint defining its software configuration (Orchestrator engine blueprint).

Cloud orchestration engine 230 can include network manager 231, infrastructure manager 232, cookbooks 233, orchestration engine blueprint 234, and one or more scripts 235.

Network manager 231 configures the network. Infrastructure manager 232 creates and configures the infrastructure.

Cookbooks 233 provide a unit of configuration and policy distribution in the configuration management tool (e.g. Chef, etc.). A cookbook defines a scenario and contains each configuration element required to support the scenario:

a) Recipes that specify the resources to be used and the order in which they will be applied.

b) Attribute values.

c) File distributions.

d) Extensions to Chef, such as custom resources and libraries.

e) Cookbook (Attributes)—the configurable parameters from the Cookbook recipe Run List.

f) Cookbook (Run List)—the Cookbook recipe's order of installing the software. A Run List is not constrained to an individual cookbook. It is typically a list of recipes from different cookbooks.

g) Cookbook (Orders)—the group of recipes that affect a specific Cookbook.

Orchestration engine blueprint 234 provides a reusable configuration for virtual machines. Orchestration engine blueprint is a server blueprint, describing a software configuration (the full software stack, including OS) that is to be provided on an individual server. This is different from a TOSCA service template or a TOSCA topology template.

Scripts 235 are lists of executable commands, which may be performed by one or more scripting engines. Scripts 235 can be in the form of text documents containing instructions written using a scripting language for generating executable processes. Scripts 235 can include one or more script parameter containing parameters that affect a script, script code that is introduced manually for a specific script, and script attachments that can permit upload or reference to any external document with the code to include in a script.

Configuration management tool 240 automates infrastructure configuration by transforming infrastructure into code. The tool automates how infrastructure is configured, deployed, and managed across the network, no matter the size and/or type of cloud. Examples of configuration management tools include, not limited by, Chef, Puppet, Ansible, etc. Configuration management tool can include servers launched in the cloud by a user launches for connecting a client with configuration management.

Cloud vendor catalog 212 stores generic images of various OS and various applications. Contains scripts that periodically communicate with cloud vendors' image catalogs and update the cloud vendor catalog of the cloud orchestrator.

Embodiments of cloud orchestrator architecture 110 and 210 permit a user to deploy any infrastructure within multiple cloud vendors by creating a single service template. The choice of cloud vendor, region and server plans can be provided as parameters of that service template.

According to some embodiments, the network and server node templates defined for the Cloud Orchestrator in the presently disclosed embodiments have a "region" property, specifying the cloud provider and region where a specific network or server is to be deployed. This is in contrast to implementations of TOSCA that do not describe deployment regions where the described infrastructure can be assumed to be deployed in a specific environment. By including a region property, a single service template can be provided to describe an infrastructure to be deployed across different cloud providers and regions. Furthermore, by expecting one or more regions as TOSCA input parameters, the service template can be parameterized to specify one or more location(s) to deploy the actual infrastructure, or portions thereof.

In a non-limiting example, a user specifies in the service template to run one server in Ubuntu 18.04 and another one in Windows Server 2012. The user leaves the server plan for both as a parameter of the service template and executes on the cloud orchestrator portal 222. The user executes the server plan to run the Ubuntu server in AWS East Virginia on a t3.medium server plan, and run the Windows server in Azure in West U.S. on a Standard B2 server plan. The firewall rules can be applied automatically to both servers, independently on which cloud vendor they are deployed. TOSCA interpreter 210 finds an Ubuntu image on that AWS region, and a Windows image on the Azure region, and launches the correct server configurations.

In one non-limiting example, a user writes a TOSCA service template, that is, a piece of code for infrastructure configuration. A first portion of the TOSCA service template can include a topology template, which defines inputs/outputs and the nodes, relationships of the nodes, and policies. According to some embodiments of system 200, cloud orchestrator-specific TOSCA data and node types allow defining a trans-cloud infrastructure.

Figure 3:
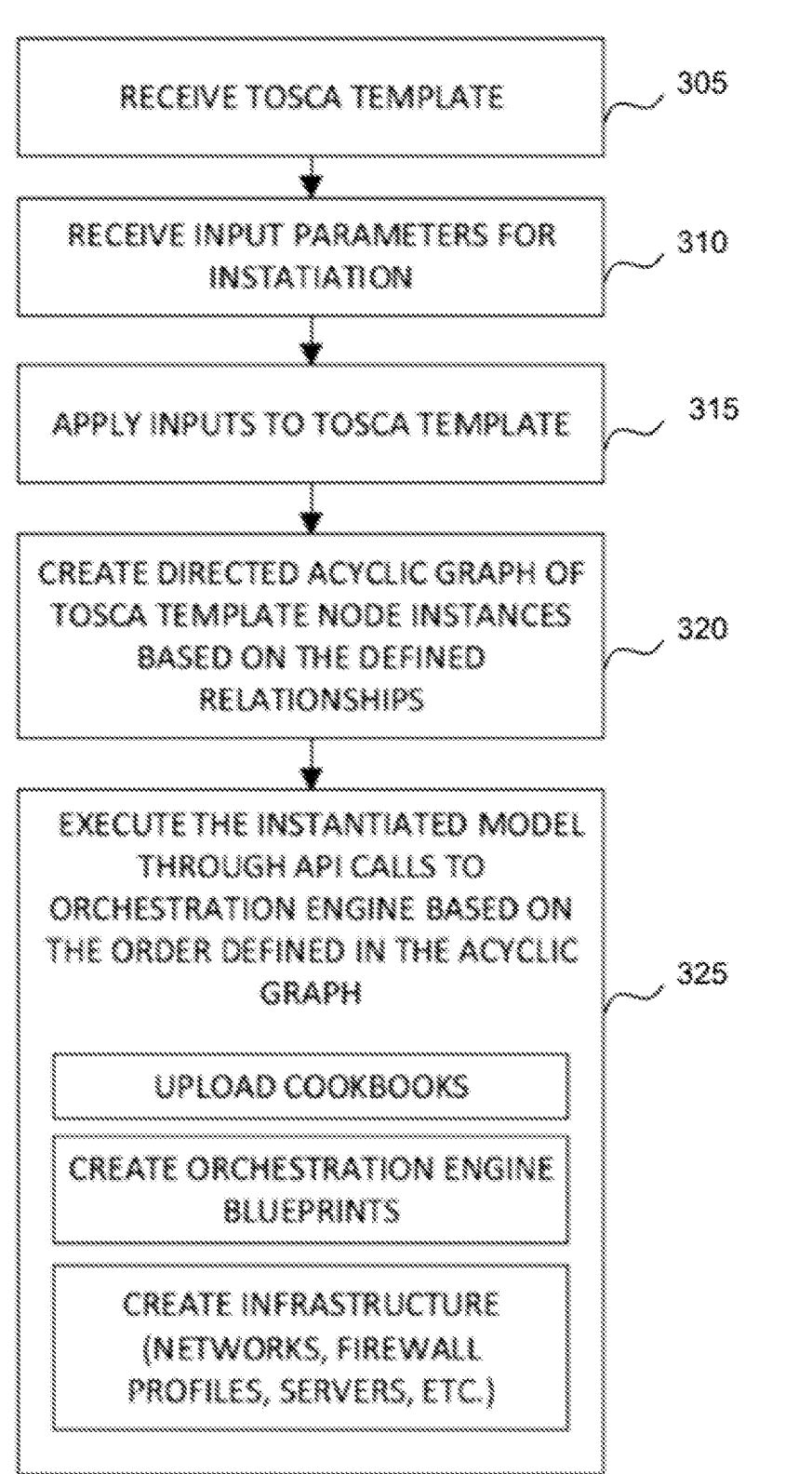
FIG. 3 schematically illustrates a process performed by a TOSCA interpreter, according to an example embodiment.

FIG. 3 is a flow diagram of a method 300 for performing Trans-Cloud infrastructure deployment, according to some embodiments of the present disclosure. In some embodiments, method 300 provides operational steps to perform an implementation of a TOSCA template performed by TOSCA interpreter 220. As described above, TOSCA interpreter 220 can execute an input provided by a user via cloud orchestrator portal 222. According to some embodiments, process 300 can include execution of operations provided as an input. Such operations can be input as software code, for example, uploaded by a user to cloud orchestrator portal 222 for execution by TOSCA interpreter 220.

Referring to FIG. 3, at operation 305, a computing device can receive an input from a user comprising a TOSCA template and/or information relating to a TOSCA template. According to some embodiments, operation 305 can include receiving input as software code uploaded by a user to cloud orchestrator portal 222, to be executed by TOSCA interpreter 220.

At operation 305, a service template can be created, and a topology template can be specified to set a number of topology template inputs. Topology template inputs can include, for example, a specification of a region of where the network and servers shall be deployed, a server plan, and Classless Inter-Domain Routing (CIDR). A non-limiting example of this code is provided below.

In this example, a topology template nested mapping is provided and input parameters are defined, including region and server plan parameters.

```
          tosca_definitions_version: tosca_simple_yaml_1_2
metadata:
     template_name: Magento
     template_author: Ingram Micro
     template_version: 0.8
topology_template:
     inputs:
          region:
               type: ingrammicro.orchestrator.datatypes.Region
               required: true
               description: Region for Magento servers
               metadata:
                    order: 1
          server_plan:
               type: ingrammicro.orchestrator.datatypes.ServerPlan
               required: true
               description: Server plan for Magento servers
               metadata:
                    dependency: region
                    order: 2
          cidr:
               type: ingrammicro.orchestrator.datatypes.vpc.CIDR
               required: true
               default: 10.0.0.0/24
               description: The CIDR block describing the VPC IPv4
address range
               metadata:
                    order: 3
          private_subnet_cidr:
               type: ingrammicro.orchestrator.datatypes.vpc.CIDR
               required: true
               default: 10.0.0.0/25
               description: The CIDR block describing the VPC IPv4
address range
               metadata:
                    order: 4
                    dependency: cidr
          public_subnet_cidr:
               type: ingrammicro.orchestrator.datatypes.vpc.CIDR
               required: true
               default: 10.0.0.128/26
               description: The CIDR block describing the VPC IPv4
address range
               metadata:
                    order: 5
                    dependency: cidr
          admin_user:
               type: string
               required: true
               description: Administrator user
               metadata:
                    order: 6
          admin_password:
               type: string
               required: true
               description: Administrator password
               metadata:
                    order: 7
          db_password:
               type: string
               required: true
               description: Password of the Magento DB
               metadata:
                    order: 8
          server_root_password:
               type: string
               required: true
```

-continued

```
               description: Root password of the server
               metadata:
                    order: 9
          sample_data:
               type: boolean
               default: true
               description: Create Sample Shop?
               metadata:
                    order: 10
```

At operation 310, the computing device can receive an input from a user comprising one or more input parameters relating to the TOSCA template, for instantiation of a Trans-Cloud infrastructure.

For example, at 310, a user can set node templates to specify a network, configuration of servers, relationships between each server, and in which region they shall be deployed. For each server, a software stack can be specified using the available solutions from a configuration management tool.

A non-limiting example of a node template, specifying input parameter for instantiation of an infrastructure model including a deployment region, is provided below:

```
     Magento:
          type: ingrammicro.orchestrator.nodes.network.VPC
          properties:
               cidr: {get_input: cidr}
               region: {get_input: region}
               ip_version: 4
          attributes: { }
     Magento Private Subnet:
          type: ingrammicro.orchestrator.nodes.network.Subnet
          properties:
               cidr: {get_input: private_subnet_cidr}
               gateway_type: private
               ip_version: 4
          attributes: { }
          requirements:
          - vpc: Magento
     Magento Public Subnet:
          type: ingrammicro.orchestrator.nodes.network.Subnet
          properties:
               cidr: {get_input: public_subnet_cidr}
               gateway_type: public
               ip_version: 4
          attributes: { }
          requirements:
          - vpc: Magento
     Magento Backend:
          type: ingrammicro.orchestrator.nodes.Compute
          properties:
               private: true
               region: {get_input: region}
               server_plan: {get_input: server_plan}
          attributes: { }
          capabilities:
               endpoint:
                    properties:
                         initiator: source
                         network_name: PRIVATE
                         port: 22
                         protocol: tcp
                         secure: true
                    attributes: { }
     Magento Backend Port:
          type: tosca.nodes.network.Port
          properties:
               is_default: true
               order: 0
          attributes: { }
          requirements:
          - link: Magento Private Subnet
          - binding: Magento Backend
```

-continued

```
Magento Frontend:
    type: ingrammicro.orchestrator.nodes.Compute
    properties:
        private: false
        region: {get_input: region}
        server_plan: {get_input: server_plan}
    attributes: { }
    capabilities:
        endpoint:
            properties:
                initiator: source
                network_name: PRIVATE
                port: 22
                protocol: tcp
                secure: true
                attributes: { }
Magento Frontend Port:
    type: tosca.nodes.network.Port
    properties:
        is_default: true
        order: 0
    attributes: { }
    requirements:
    - link: Magento Public Subnet
    - binding: Magento Frontend
Magento Backend Stack:
    type: ingrammicro.orchestrator.nodes.SoftwareStack
    requirements:
    - blueprint: Magento Backend Blueprint
    - host: Magento Backend
Magento Backend Blueprint:
    type: ingrammicro.orchestrator.nodes.Blueprint
    properties:
        service_list:
        - magento::database@0.7.1
        configuration_attributes:
            magento:
                db:
                    password: {get_input: db_password}
                    sample_data: {get_input: sample_data}
                user:
                    username: {get_input: admin_user}
                    password: {get_input: admin_password}
            mysql:
                allow_remote_root: "true"
                root_network_acl: 0.0.0.0/0
                root_password: {get_input:
                server_root_password}
    capabilities:
        os:
            properties:
                architecture: x86_64
                distribution: ubuntu
                type: linux
                version: "14.04"
    interfaces:
        Standard:
            create:
                inputs:
                    cookbook_file: { get_artifact: [SELF,
magento_cookbook] } artifacts:
                    magento_cookbook:
                        type:
ingrammicro.orchestrator.artifacts.Chef.CookbookArchive
                        file: cookbooks/magento-0.7.1.tar.gz
Magento Frontend Stack:
    type: ingrammicro.orchestrator.nodes.SoftwareStack
    properties:
        configuration_variables:
            backend:
                reference:
                    get_attribute: [Magento Backend, tosca_id]
                type: server
    requirements:
    - host: Magento Frontend
    - blueprint: Magento Frontend Blueprint
    - dependency: Magento Backend
Magento Frontend Blueprint:
    type: ingrammicro.orchestrator.nodes.Blueprint
```

-continued

```
    properties:
        service_list:
        - magento::frontend@0.7.1
        configuration_attributes:
            magento:
                db:
                    host:
                        $apply:
                        - $private_ip
                        - $server: backend
                    password: {get_input: db_password}
                    sample_data: {get_input: sample_data}
                user:
                    username: {get_input: admin_user}
                    password: {get_input: admin_password}
    capabilities:
        os:
            properties:
                architecture: x86_64
                distribution: ubuntu
                type: linux
                version: "14.04"
```

At operation 315, the computing device can apply one or more inputs at 310 to the TOSCA template specified at 305. Referring to the non-limiting example described above, 315 can include applying input parameters specifying the region and server_plan parameters to the TOSCA template, in addition to other input parameters received at 310.

At operation 320, the computing device can create a directed acyclic graph (DAG) of the TOSCA node instances based on relationships defined in the above steps. The topology template is translated as a DAG that describes the structure of an application to be deployed, including its components in the form of nodes based on the, node templates defined at 315, and their relations (e.g., edges), which can be defined based on relationship templates. The DAG can include includes application-specific components, middleware, infrastructure components, and the like.

Figure 4:
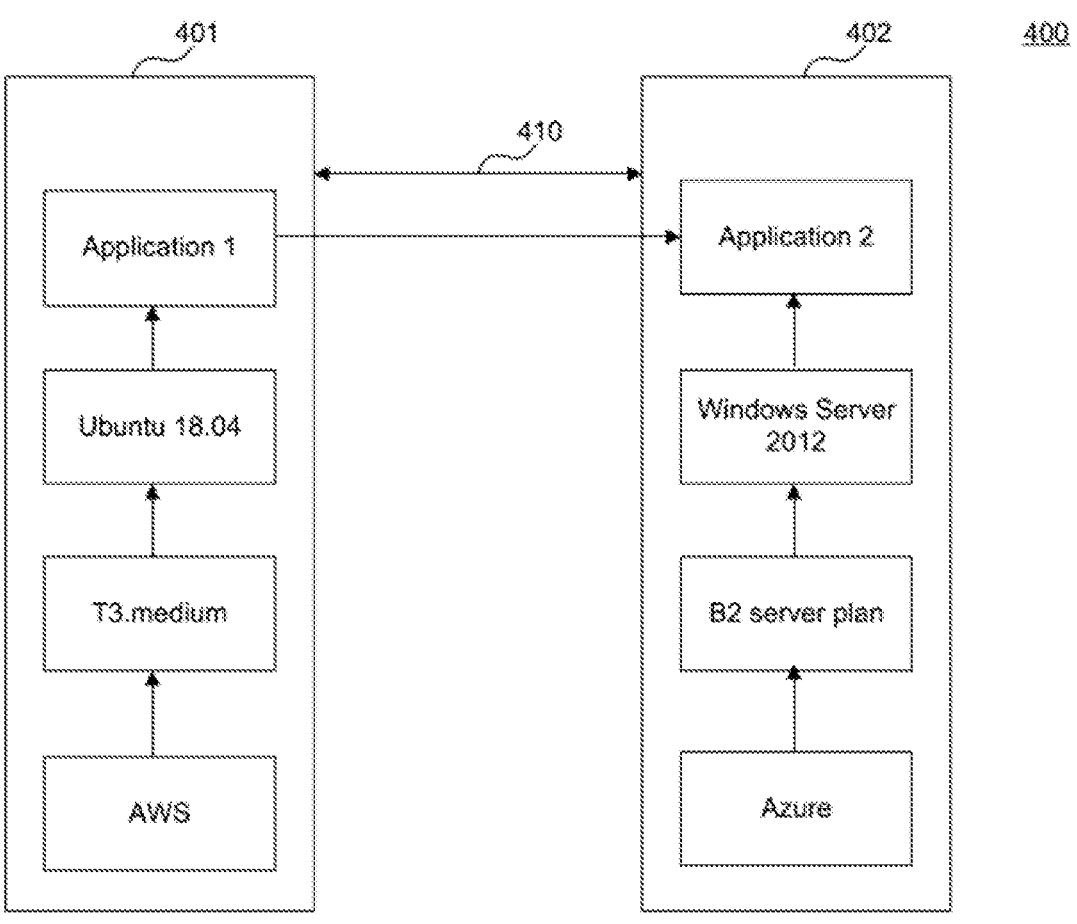
FIG. 4 illustrates a directed acyclic graph (DAG) instantiation provided by a TOSCA interpreter, according to an example embodiment.
Figure 5:
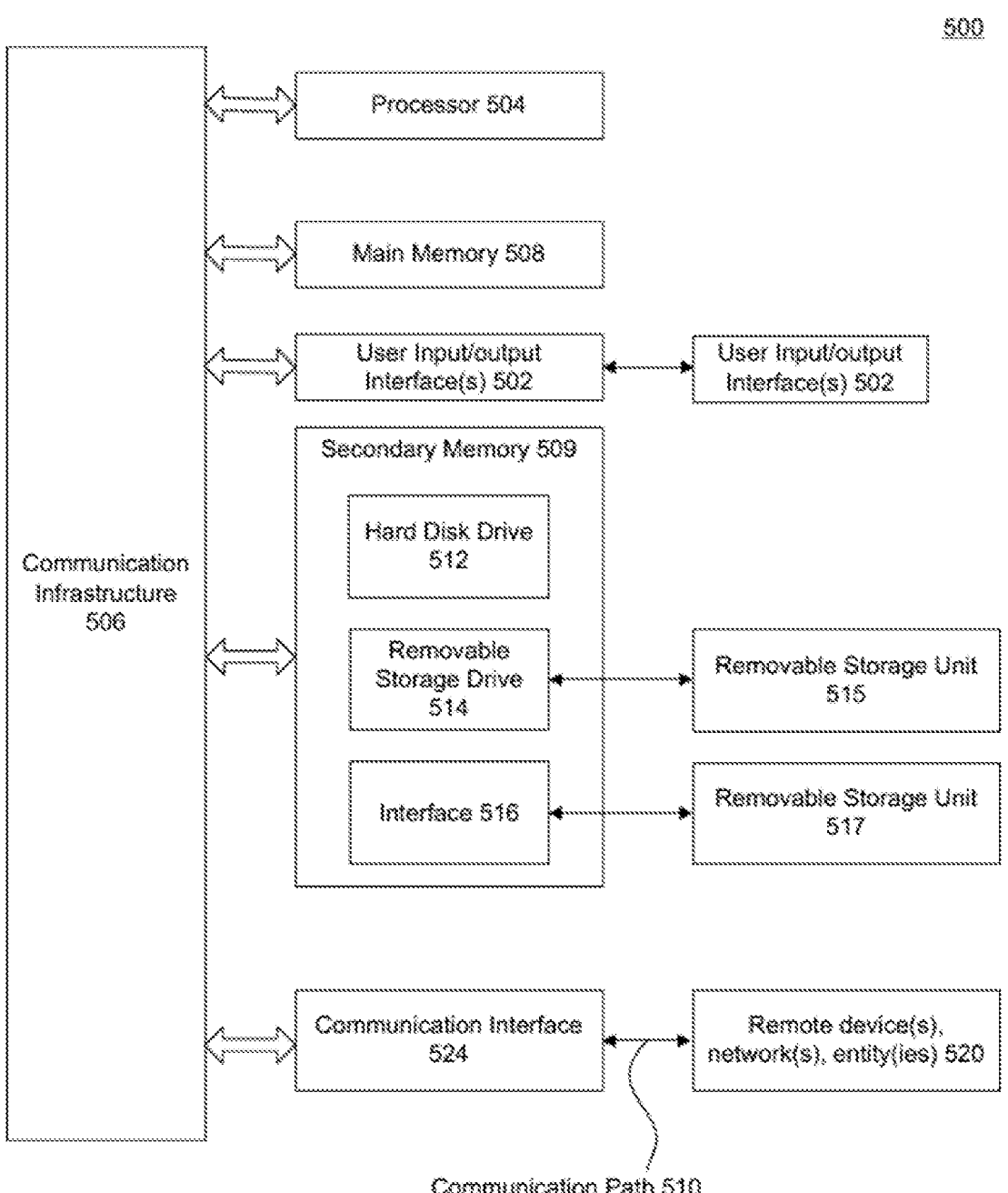
FIG. 5 illustrates an example computing device, according to an example embodiment.

An exemplary DAG specifying node instances 401 and 402 and relationships 410 between node elements is provided at FIG. 4, for illustration of the non-limiting example mentioned above. DAG 400 specifies one server run 401 in Ubuntu 18.04 and another server 402 in Windows Server 2012. The Ubuntu server is run AWS East Virginia on a t3.medium server plan, and the Windows server is run in Azure in West U.S. on a Standard B2 server plan.

At operation 325, the computing device can execute the instantiated model. Operation 325 can include receiving API calls by an orchestration engine based on the order defined in the DAG.

According to some embodiments, operation 325 can include receiving cookbooks 233 by orchestration engine 230. In a non-limiting example, a user can upload cookbooks 233 to be received by orchestration engine 230.

Cookbooks 233 provide a unit of configuration and policy distribution in the configuration management tool (e.g. Chef, etc.). A cookbook defines a scenario and contains each configuration elements, including recipes to specify resources to be used and order for applying resources, attribute values, file distributions, Chef extensions, other configuration elements, as described above.

According to some embodiments, operation 325 can include receiving blueprints, which define a reusable configuration for virtual machines. For example, each blueprint can describe a software configuration to be provided on each individual server.

According to some embodiments, operation 325 can include receiving scripts 235 containing lists of executable commands, which may be performed by one or more scripting engines, for example, at start up, shut down, or any other applicable time. Operation 235 can include receiving scripts including one or more script parameter containing parameters that affect a script, script code for a specific script, and script attachments.

In one non-limiting example, orchestration engine can receive inputs including policies via API calls. For example, a user may set policies, such as firewall configurations, which are submitted to the orchestration engine. Exemplary code submitted to orchestration engine, for implementing a firewall, including firewall policies, is provided below:

```
- Magento Backend Firewall:
        type: ingrammicro.orchestrator.policies.FirewallProfile
        properties:
            rules:
                - port_range:
                    - 22
                    - 22
                    source: any
                    type: tcp
                - port_range:
                    - 5985
                    - 5985
                    source: any
                    type: tcp
                - port_range:
                    - 3389
                    - 3389
                    source: any
                    type: tcp
                - port_range:
                    - 10050
                    - 10050
                    source: any
                    type: tcp
                - name: mysql
                    port_range:
                    - 3306
                    - 3306
                    source: {get_input: cidr}
                    type: tcp
        targets:
        - Magento Backend
- Magento Frontend Firewall:
        type: ingrammicro.orchestrator.policies.FirewallProfile
        properties:
            rules:
                - port_range:
                    - 22
                    - 22
                    source: any
                    type: tcp
                - port_range:
                    - 5985
                    - 5985
                    source: any
                    type: tcp
                - port_range:
                    - 3389
                    - 3389
                    source: any
                    type: tcp
                - port_range:
                    - 443
                    - 443
                    source: any
                    type: tcp
                - port_range:
                    - 80
                    - 80
                    source: any
                    type: tcp
                - port_range:
```

-continued

```
                    - 10050
                    - 10050
                    source: any
                    type: tcp
        targets:
        - Magento Frontend
outputs:
    frontend_ip:
        type: string
        description: IP of Magento Frontend server
        value: {get_attribute: [Magento Frontend, public_address]}
    frontend_id:
        type: string
        description: TOSCA ID of Magento Frontend server
        value: {get_attribute: [Magento Frontend, tosca_id]}
```

Various embodiments may be implemented, for example, using one or more computer systems, such as computer system 500 shown in FIG. 6. One or more computer systems 500 may be used, for example, to implement any of the embodiments discussed herein, as well as combinations and sub-combinations thereof. For example, computer system 500 can be used to implement system 200 for performing Trans-Cloud infrastructure deployment, including cloud orchestration architecture 210 of FIG. 2, method 300 for performing Trans-Cloud infrastructure deployment, and/or any other implementations of the disclosed embodiments.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

From the above disclosure, it will be appreciated that the disclosed embodiments provide abstractions over the specific cloud vendor infrastructure. Therefore, a user can define a template that can easily be parameterized over the cloud vendor the user wants to use to deploy the template. So, while prior art systems claim that they are multi-cloud, this solution is more than this. That is why the word "trans-cloud" is more suitable to characterize this approach.

The disclosed embodiments allow for an integrated description of all aspects of a cloud application, from infrastructure and networks to software components and their relationships. It separates the description of topology from the implementation technology. It describes more than just the infrastructure. It allows abstraction over the implementation of technology.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A system for processing Trans-Cloud application templates, comprising:

a server, coupled to a processor, and configured to execute instructions that:

receive an input from a user, the input comprising a Topology and Orchestration Specification for Cloud Applications (TOSCA) template and input parameters for instantiation via a graphical user interface (GUI);

apply input parameters to the TOSCA template;

analyze the TOSCA template to identify relationships between infrastructure components and dynamically build a directed acyclic graph of TOSCA node template instances based on the relationships between the infrastructure components;

instantiate the TOSCA service template based on the directed acyclic graph;

execute the instantiated model by invoking API calls to an orchestration engine based on the order defined in the acyclic graph, wherein the orchestration engine supports dynamic selection of cloud vendors, regions, server plans, and other parameters during the deployment of the Trans-Cloud application template, and wherein the orchestration engine is configured to define an order compatible with one or more of the cloud vendors and to accommodate the order defined in the TOSCA service template through modifications by the TOSCA interpreter;

receive one or more cookbooks comprising one or more recipes, attribute values, file distributions, and/or extensions to Chef, wherein the cookbooks provide a unit of configuration and policy distribution and define a scenario, including each configuration element required to support the scenario, the cookbooks further comprising custom resources and libraries as extensions to Chef, wherein the orchestration engine retrieves and applies cookbooks in an order determined by the directed acyclic graph to configure instantiated infrastructure components, wherein the orchestration engine dynamically selects cloud vendors and regions based on the order defined in the acyclic graph, such that different components of an application can be deployed to discrete cloud vendors or regions based on the TOSCA template, and wherein the system processes the cookbooks by applying configuration instructions defined in the cookbooks to the infrastructure components instantiated based on the TOSCA template.

2. The system of claim 1, wherein the server comprises a cloud orchestrator API, a TOSCA interpreter, and an orchestrator engine.

3. The system of claim 1, wherein the TOSCA template comprises a region property specifying at least one of a cloud provider and region where a specific network or server is to be deployed.

4. The system of claim 1, wherein the TOSCA template comprises a server plan property specifying a plan for a node specified in the TOSCA template and configured to instantiate a server.

5. The system of claim 1, wherein the executing the instantiated model comprises deploying a cloud infrastructure based on the acyclic graph.

6. The system of claim 1, the system further configured to automate infrastructure Trans-Cloud application template deployment processes.

7. The system of claim 1, wherein creating the acyclic graph comprises dynamically building, by the TOSCA interpreter, a directed acyclic graph of TOSCA node template instances based on the TOSCA template and input parameters.

8. A computer-implemented method, comprising:

receiving an input from a user, the input comprising a Topology and Orchestration Specification for Cloud Applications (TOSCA) template and input parameters for instantiation via a graphical user interface (GUI);

applying the input parameters to the TOSCA template;

analyzing the TOSCA template interpreter to identify relationships between infrastructure components and dynamically build a directed acyclic graph of the TOSCA template based on the relationships between the infrastructure components; and instantiating the TOSCA service template based on the directed acyclic graph;

executing the instantiated model by invoking API calls to orchestration engine based on the order defined in the acyclic graph, wherein the orchestration engine supports dynamic selection of cloud vendors, regions, server plans, and other parameters during the deployment of the Trans-Cloud application template, and wherein the orchestration engine is configured to define an order compatible with one or more of the cloud vendors and to accommodate the order defined in the TOSCA service template through modifications by the TOSCA interpreter;

receiving one or more cookbooks comprising one or more recipes, attribute values, file distributions, and/or extensions to Chef, wherein the cookbooks provide a unit of configuration and policy distribution and define a scenario, including each configuration element required to support the scenario, the cookbooks further comprising custom resources and libraries as extensions to Chef, wherein the orchestration engine retrieves and applies cookbooks in an order determined by the directed acyclic graph to configure instantiated infrastructure components, wherein the orchestration engine dynamically selects cloud vendors and regions based on the order defined in the acyclic graph, such that different components of an application can be deployed to discrete cloud vendors or regions based on the TOSCA template, and wherein the computer processes the cookbooks by applying configuration instructions defined in the cookbooks to the infrastructure components instantiated based on the TOSCA template.

9. The method of claim 8, wherein the TOSCA template comprises a region property specifying at least one of a cloud provider and region where a specific network or server is to be deployed.

10. The method of claim 8, wherein the TOSCA template comprises a server plan property specifying a plan for a node specified in the TOSCA template and configured to instantiate a server.

11. The method of claim 8, wherein the executing the instantiated model comprises deploying a cloud infrastructure based on the acyclic graph.

12. The method of claim 8, wherein creating the acyclic graph comprises dynamically building, by a TOSCA interpreter, a directed acyclic graph of TOSCA node template instances based on the TOSCA template and input parameters.

13. A non-transitory tangible computer-readable device having instructions stored thereon that, when executed by a computing device, cause the computing device to perform operations comprising:

receiving an input from a user, the input comprising a TOSCA template and input parameters for instantiation via a graphical user interface (GUI);

applying the input parameters to the TOSCA template;

analyzing the TOSCA template to identify relationships between infrastructure components and dynamically build a directed acyclic graph of the TOSCA template based on the relationships between the infrastructure components; and instantiating the TOSCA service template based on the directed acyclic graph;

executing the instantiated model by invoking API calls to orchestration engine based on the order defined in the acyclic graph, wherein the orchestration engine supports dynamic selection of cloud vendors, regions, server plans, and other parameters during the deployment of the Trans-Cloud application template, and wherein the orchestration engine is configured to define an order compatible with one or more of the cloud vendors and to accommodate the order defined in the TOSCA service template through modifications by the TOSCA interpreter;

receiving one or more cookbooks comprising one or more recipes, attribute values, file distributions, and/or extensions to Chef, wherein the cookbooks provide a unit of configuration and policy distribution and define a scenario, including each configuration element required to support the scenario, the cookbooks further comprising custom resources and libraries as extensions to Chef, wherein the orchestration engine retrieves and applies cookbooks in an order determined by the directed acyclic graph to configure instantiated infrastructure components, wherein the orchestration engine dynamically selects cloud vendors and regions based on the order defined in the acyclic graph, such that different components of an application can be deployed to discrete cloud vendors or regions based on the TOSCA template, and wherein the computing device processes the cookbooks by applying configuration instructions defined in the cookbooks to the infrastructure components instanti-
ated based on the TOSCA template.

14. The non-transitory tangible computer-readable device
of claim 13, wherein instructions are configured to be
executed utilizing a TOSCA interpreter and orchestrator
engine of the computing device.

15. The non-transitory tangible computer-readable device
of claim 13, wherein the TOSCA template comprises a
region property specifying at least one of a cloud provider
and region where a specific network or server is to be
deployed, and a server plan property specifying a plan for a
node specified in the TOSCA template and configured to
instantiate a server.

16. The non-transitory tangible computer-readable device
of claim 13, wherein the executing the instantiated model
comprises deploying a cloud infrastructure based on the
acyclic graph.

17. The non-transitory tangible computer-readable device
of claim 13, the non-transitory tangible computer-readable
device further configured to automate infrastructure Trans-
Cloud application template deployment processes.

18. The non-transitory tangible computer-readable device
of claim 13, wherein creating the acyclic graph comprises
dynamically building, by the TOSCA interpreter, a directed
acyclic graph of TOSCA node template instances based on
the TOSCA template and input parameters.

\* \* \* \* \*